July 20, 1937.  E. ROSS ET AL  2,087,333
LENS MOUNT
Filed June 4, 1935   2 Sheets-Sheet 1
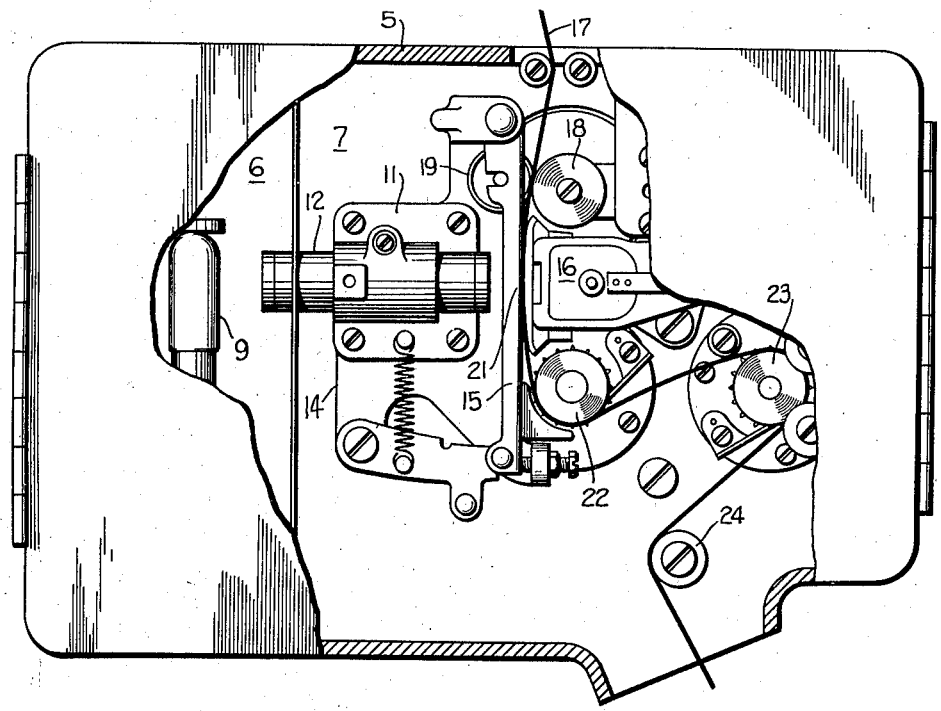
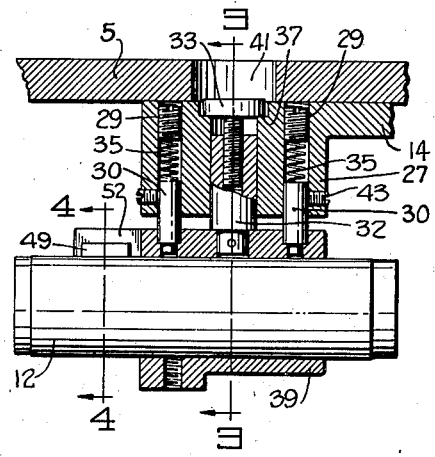
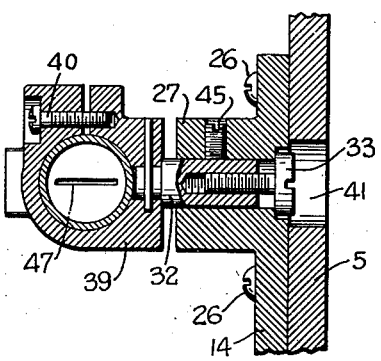
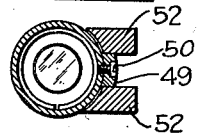
INVENTORS
Edwin L. Fischer
Ernest Ross
BY
ATTORNEY

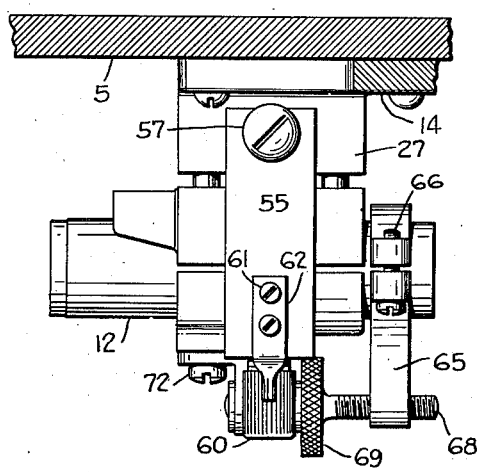
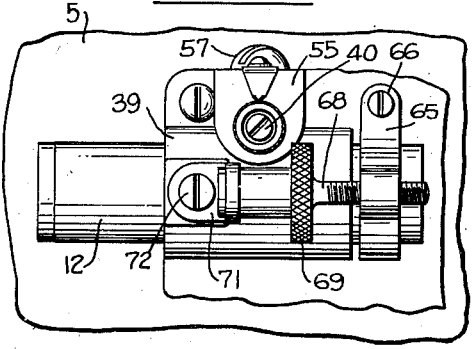
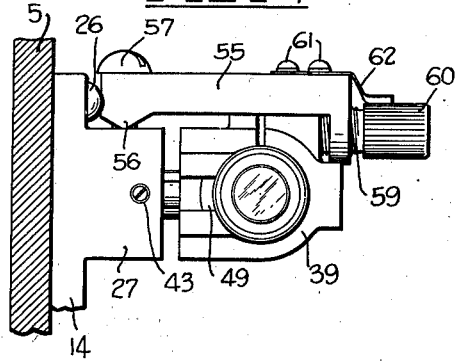 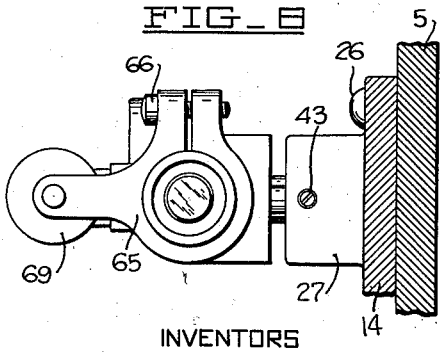
INVENTORS
Edwin L. Fischer
Ernest Ross.
BY *Orl R. Goshaw*
ATTORNEY Patented July 20, 1937

2,087,333

UNITED STATES PATENT OFFICE 2,087,333

LENS MOUNT

Ernest Ross, Elmhurst, and Edwin L. Fischer, Jackson Heights, N. Y., assignors to United Research Corporation, Long Island City, N. Y., a corporation of Delaware Application June 4, 1935, Serial No. 24,832

5 Claims. (Cl. 179—100.3)

This invention relates to talking motion picture apparatus and particularly to the mounting of an element thereof which directs and defines a light beam for recording or reproducing sound.

The object of the invention is to facilitate the focusing of the optical system used in sound recording and reproducing units wherein sound is recorded on or reproduced from a moving film.

In certain sound recording systems used in connection with talking motion pictures, a light beam is impressed upon a moving film through an optical system which usually includes a slit for shaping the beam. The optical system is arranged to focus the slit upon the film so that variations in light therethrough are sharply impressed upon the film in accordance with the sound waves being recorded. In certain sound reproducing systems, the same general type of optical slit system is employed, the light, however, being passed through the film onto a light sensitive device for receiving the variations in light caused by the film record. In both instances, the position of the film is fixed by guiding means and sprockets. Other associated elements, such as the light source, may also be fixed and it is therefore desirable to have the lens system adjustable for the purpose of properly relating the light source and film and for focusing the light slit upon the film at the proper point.

The present invention is directed, therefore, to a mounting for the lens system which provides flexibility of the lens and slit assembly with respect to the light source and film. The novel features of the invention as well as the invention itself will be more fully understood by reference to the following description read in conjunction with the accompanying drawings, in which Fig. 1 is a sectional view of a sound reproducing unit embodying the invention.

Figs. 2, 3 and 4 are cross-sectional views of portions of the lens mount; and

Figs. 5, 6, 7 and 8 are plan and elevational views of attachments to aid in the adjustments of the mount.

Referring specifically to Fig. 1, a housing or casing 5 is divided into two compartments 6 and 7, compartment 6 containing a lamp 9 of constant intensity. In compartment 7 a lens mount 11 having a lens barrel 12 is shown mounted upon a base frame or mounting plate 14 in conjunction with a sound gate 15. A photo-sensitive device is contained in a holder 16, this holder construction being disclosed and claimed in co-pending application Serial No. 20,957 filed May 11, 1935. A film 17 is passed from a supply reel or picture projection apparatus, not shown, between a flywheel roller 18 and a spring pressed roller 19 past the sound translation point at 21 over a drive sprocket 22 around a holdback sprocket 23 and over an idler roller 24 to a take-up reel, not shown. The sound gate mechanism 15 is disclosed and claimed in a co-pending application Serial No. 28,846 filed June 28, 1935 and the mounting for the flywheel roller 18 is disclosed and claimed in a co-pending application Serial No. 28,847 filed June 28, 1935.

As the position of the film at the translation point 21 is maintained in a fixed position by the sound gate 15 and the lamp 9, although adjustable, has a preferred position with respect to the film, the lens barrel mounting 11 is constructed to provide both a lateral movement thereof and a movement along a line connecting the lamp and the film at the translation point or along the optical axis of the lens system.

Now referring to Figs. 2, 3 and 4, the mounting base 14 has integrally cast thereto a bracket or projection 27. This base 14 and projection 27 is partially tapped to accommodate headless screws 29 and drilled for slidable sleeves or pins 30 in the same holes. Another hole is provided in extension 27 to accommodate a slidable stud 32 which is tapped for a screw 33. Coiled compression springs 35 are inserted between the screws 29 and pins 30, the springs being maintained under compression by the screw 33 since the head of the screw abuts a shoulder 37. By turning the screw 33 the position of the stud 32 is varied anteriorly of the base 14. Screws 26 attach this assembly to the wall 5.

On the extensions of stud 32 and pins 30, is fastened a lens barrel holder 39 which has a cylindrical hole therein to accommodate the barrel 12 and which is split on top to permit a longitudinal adjustment of the barrel therein. A screw 40 joins the two split sections and tightens the holder to maintain the barrel in its proper position when once adjusted. Any adjustment of the screw 33 will laterally vary the lens barrel with respect to the lamp 9 and film translation point 21 since movement of the screw in one direction compresses the springs 35 and movement in the other direction allows the springs to force the holder outwardly. As this mount is attached to the wall of the casing 5, a hole 41 is provided therein so that the lateral adjustment may be made when the entire assembly is in position. Set screws 43 are also provided to lock the pins 30 in final adjusted position while a set screw 45 locks the stud 32.

As shown in Figs. 3 and 4, a slit 47 is positioned within the lens barrel 12 and as this slit must always be horizontal when the film is advanced in a vertical direction, the barrel is prevented from rotating by an extension or lug 49 attached to the barrel by means of a screw 50. This lug slides in a groove formed by extensions 52 of the holder 39 and maintains the slit properly oriented with respect to the film.

The mount as just described provides for two adjustments, one along the optical axis of the lens system, and the other transversely of this axis. The optical axis adjustment is made by loosening the screw 40 and positioning the lens in its holder 39 at the proper position, while the lateral adjustment, as stated above, is made by turning the screw 33 which may be accomplished by a screwdriver through the opening 41 in the wall of the casing 5.

Referring now to Figs. 5, 6, 7 and 8, an indicator for the lateral adjustment and a vernier control for the optical adjustments are shown, these being attachments which are removable.

For the lateral adjustment, a U-shaped member 55 has a tapered arm 56 which is attached to the extension 27 by means of a screw 57. The other arm of the member 55 has a tapped hole therein accommodating a hollow screw 59 with a hollow knurled or ridged hand knob 60. Attached to the member 55 by screws 61 is a spring member 62 which bears on the knob 60 and is so shaped as to fit between the ridges on the surface thereof. When using this lateral adjustment, the screw 33 is removed (see Fig. 2) and the set screws 43 and 45 are backed off. The turning of the screw 59 in one direction forces the holder 39 against the tension of the springs 35 for one direction of movement. The turning of the screw in the other direction permits the springs to force the holder outwardly for the opposite direction of movement. As it sometimes happens, a different lateral position of the lens barrel is required for different types of records or for records at different positions on the film carriers. In these instances it is desirable to note the amount of adjustment by counting the notches or ridges on the knob 60 as the screw 59 is rotated in order to facilitate the resetting of the lens assembly at its original position.

To facilitate the adjustment of the lens barrel 12 along the optical axis of the lenses for focusing the light upon the film, a clamp 65, provided with a tightening screw 66, is mounted at one extremity of the lens barrel. One end of the clamp 65 is tapped to accommodate a screw 68 having a knurled hand knob 69, one end of the screw being rotatably fixed in a bracket 71 attached to the holder 39 by a screw 72. Turning the knob 69, therefore, will slide the lens barrel 12 in the holder 39 between the lamp and film. When this adjustment is once properly made it may remain fixed for all types of film and consequently the clamp 65, screw 68, and bracket 71 may be removed from the mount. The screw 40 is tightened through the hole provided by the hollow portion of the screw 59 (Fig. 6) if this adjustment is made when the bracket 55 is attached.

Although this invention has been disclosed embodied in a sound reproducing unit, it is also applicable to recording units or like systems wherein the optical system is to be adjusted from time to time.

What is claimed is:

1. In a sound reproducing unit, a casing having a plurality of compartments, a constant intensity light source mounted in one compartment, film driving means mounted in another compartment and comprising a continuous rotating sprocket, a stabilizing flywheel roller, a film gate shoe having an aperture therein and a film gate for maintaining said film in a position on said shoe, a base plate mounted on said casing for supporting said shoe and film gate, a bracket mounted on said base plate, a lens and slit assembly for transmitting light from said light source to a film in said gate, a holder for said lens and slit assembly mounted on said bracket, said assembly being adjustable in said holder, resilient means for urging said holder away from said bracket, a screw for adjusting said holder against said resilient means transversely of said film, said screw being accessible through said bracket and said casing, means for locking said assembly in said holder, and means for locking said holder to said bracket.

2. In an adjustable lens assembly mount for a sound reproducing device, a supporting wall, a bracket mounted on said wall, a lens and slit assembly, a holder for said assembly, resilient means urging said holder from said bracket, a member fixedly attached to said bracket and extending over said holder, screw means threadedly engaging said member and adapted to urge said holder against said resilient means, said screw means being ridged about its circumference, and a resilient pointer attached to said member and bearing on the ridges of said screw means for holding said screw means in position and for indicating movement thereof.

3. In an adjustable lens assembly mount, for a sound reproducing device, the combination of a holder for said assembly, a bracket adapted to mount said holder, resilient means urging said holder away from said bracket, a U-shaped member fixedly attached to said bracket, screw means having a ridged hand knob threadedly engaging said member and adapted to move said holder towards said bracket, a resilient member bearing on said knob for indicating the movement of said screw means, and means for adjusting said lens and slit assembly in said holder, said means comprising a collar attached to one end of said assembly and screw means engaging said collar attached to said holder.

4. A lens and slit assembly for a sound reproducing device comprising a bracket, a holder for said assembly, means for attaching said holder to said bracket, a member fixedly attached to said bracket, hollow means engaging said member and said holder and having a ridged hand knob for adjusting said holder with respect to said bracket, resilient means cooperating with the ridges of said knob for maintaining said knob in position, means for adjusting said assembly along the optical axis thereof in said holder, and means for locking said assembly in position in said holder, said locking means being accessible through said hollow means.

5. In a lens and slit assembly mount for a sound reproducing device, a lens and slit tube, a holder for said tube, means for adjusting said tube in said holder along the optical axis of said tube, means for locking said tube in position in said holder, a bracket for mounting said holder, means for adjusting said holder with respect to said bracket, said adjusting means covering said locking means for said holder and including a hollow screw having a corrugated exterior for controlling the position of said holder with respect to said bracket and providing access to said locking means through said screw, and a resilient pointer bearing on said corrugations for indicating the amount of adjustment of said hollow screw.

ERNEST ROSS.
EDWIN L. FISCHER.